US012745028B2

(12) United States Patent

Chusseau et al.

(10) Patent No.: US 12,745,028 B2
(45) Date of Patent: Sep. 22, 2026

(54) SET-TOP BOX OF REDUCED HEIGHT

(71) Applicant: SAGEMCOM BROADBAND SAS, Bois-Colombes (FR)

(72) Inventors: Hugo Chusseau, Bois-Colombes (FR); Radu Nedelcu, Bois-Colombes (FR); Stéphane Delplace, Bois-Colombes (FR); Gilles Bourgoin, Bois-Colombes (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 0 days.

(21) Appl. No.: 18/633,180

(22) Filed: Apr. 11, 2024

(65) Prior Publication Data

US 2024/0348957 A1 Oct. 17, 2024

(30) Foreign Application Priority Data

Apr. 17, 2023 (FR) ........................................ 2303802

(51) Int. Cl.

| | |
|---|---|
| ***H04R 1/02*** | (2006.01) |
| ***H04R 1/26*** | (2006.01) |
| ***H04R 1/40*** | (2006.01) |
| ***H04R 3/12*** | (2006.01) |
| ***H04R 5/02*** | (2006.01) |

(52) U.S. Cl.

CPC ............... *H04R 1/028* (2013.01); *H04R 1/26* (2013.01); *H04R 1/403* (2013.01); *H04R 3/12* (2013.01); *H04R 5/02* (2013.01); *H04R 2205/022* (2013.01)

(58) Field of Classification Search

CPC .......... H04R 1/028; H04R 1/26; H04R 1/403; H04R 3/12; H04R 5/02; H04R 2205/022

See application file for complete search history.

(56) References Cited

U.S. PATENT DOCUMENTS

| | | |
|---|---|---|
| 2014/0177883 A1 | 6/2014 | Syed et al. |
| 2016/0127831 A1 | 5/2016 | Merz |

(Continued)

FOREIGN PATENT DOCUMENTS

| | | |
|---|---|---|
| CN | 203933931 U * | 11/2014 |
| CN | 210053546 U * | 2/2020 |
| EP | 4451700 B1 | 5/2025 |

(Continued)

OTHER PUBLICATIONS

An International Search Report issued in corresponding FR application No. 2303802 dated Nov. 7, 2023 (2 pages).

*Primary Examiner* — Sunita Joshi

(74) *Attorney, Agent, or Firm* — MUNCY, GEISSLER, OLDS & LOWE, P.C.

(57) ABSTRACT

A set-top box, integrating a speaker having an acoustic box. At least two first loudspeakers and one second loudspeaker are integrated. The two first loudspeakers are positioned at the front and on each side of the acoustic box. A central axis (X2) of a membrane of the second loudspeaker is a vertical axis. The set-top box includes, in addition, a main electronic board having a decoding module and an audio module. The second loudspeaker and the main electronic board are positioned on either side and extending successively along a length (L') of the set-top box which is perpendicular to a front-to-rear axis of the acoustic box.

13 Claims, 10 Drawing Sheets

(56) References Cited

U.S. PATENT DOCUMENTS

| | | | | |
|---|---|---|---|---|
| 2021/0368261 | A1* | 11/2021 | Susini | H04R 1/02 |
| 2022/0124434 | A1 | 4/2022 | Lehnert et al. | |

FOREIGN PATENT DOCUMENTS

| | | | |
|---|---|---|---|
| FR | 3110797 | A1 | 11/2021 |
| FR | 3110799 | A1 | 11/2021 |
| FR | 3139405 | A1 | 3/2024 |

* cited by examiner

SET-TOP BOX OF REDUCED HEIGHT

The invention relates to the field of set-top boxes and, in particular, set-top boxes integrating a speaker.

BACKGROUND OF THE INVENTION

A set-top box (or STB) is, very conventionally, intended to be connected to a television via an HDMI (High Definition Multimedia Interface) cable.

The set-top box acquires an incoming stream, which is for example, an audiovisual stream. The incoming stream can be an external incoming stream coming from an external source: local network, satellite, cable, DVB-T (Digital Video Broadcasting-Terrestrial), xDSL (Digital Subscriber Line), etc. The incoming stream can also be an internal incoming stream coming from a source which is internal to the set-top box, for example a hard disk of the HDD (Hard Disk Drive) type.

The set-top box extracts an audio stream and a video stream from the audiovisual stream, and transmits the video stream and the audio stream to the television. The television plays back the video stream via its screen, and plays back the audio stream via its loudspeakers.

The audio stream can also be transmitted to external equipment: soundbar, smart speaker, etc.

It is considered to equip a set-top box with a speaker comprising an acoustic box and loudspeakers integrated in the acoustic box. The set-top box is thus capable of playing back the audio stream and of implementing sound spacing effects.

The set-top box is generally positioned in the proximity of the television, for example on the side of it, or in a piece of furniture on which the television is placed. The precise position of the set-top box with respect to the user is therefore not initially known.

Moreover, the size of the set-top box must be limited, such that it can be installed by the user, without difficulty.

The random positioning of the set-top box with respect to the user, as well as limiting its volume, clearly limit the sound performance of the set-top box, as well as the correct output of the sound spacing effects.

AIM OF THE INVENTION

The invention aims to improve the sound playback of a speaker of a set-top box, and to improve the sound spacing implemented via the speaker.

SUMMARY OF THE INVENTION

In view of achieving this aim, a set-top box is proposed, integrating a speaker which comprises an acoustic box, wherein at least two first loudspeakers are integrated, arranged to play back medium and high frequencies, and a second loudspeaker arranged to play back low frequencies, the two first loudspeakers being positioned at the front and on each side of the acoustic box, a central axis of a membrane of the second loudspeaker being a vertical axis, the set-top box comprising, in addition, a main electronic board comprising a decoding module and an audio module, the second loudspeaker and the main electronic board being positioned on either side, and extending successively along a length of the set-top box which is perpendicular to a front-to-rear axis of the acoustic box.

The positioning of the main electronic board and of the second loudspeaker makes it possible to reduce the height of the set-top box. The set-top box can thus be positioned in front of the television and therefore facing the user.

This arrangement makes it possible to have first loudspeakers having relatively high dimensions, which improve their capacity to reproduce low frequencies. It is therefore possible to increase the frequency range on which the spacing effects are applied, without risking degrading the audio playback during the mixing of the low-frequency components of the spaced channels.

It is also possible to have a large spacing between the first loudspeakers.

These features make it possible to very clearly improve the sound spacing effects.

In addition, the large spacing between the first loudspeakers makes it possible to preserve a large internal volume of the acoustic box, despite its reduced height, which, again, improves the sound performance of the speaker.

In addition, a set-top box such as described above is proposed, wherein the two first loudspeakers are each oriented towards the outside of the acoustic box, such that for each first loudspeaker, an angle between a central axis of a membrane of said first loudspeaker and the front-to-rear axis of the acoustic box is between 30° and 50°, a ratio between a distance between centres of the membranes of the first loudspeakers, and a height of the acoustic box, being greater than 5, and a ratio between a diameter of the membrane of each first loudspeaker and the height of the acoustic box being greater than 0.4.

In addition, a set-top box such as described above is proposed, wherein:

- for each first loudspeaker, the angle between the central axis of the membrane of said first loudspeaker and the front-to-rear axis of the acoustic box is in the range [38°; 42°];
- the distance between the centres of the membranes of the first loudspeakers is in the range [320 mm; 380 mm];
- the height of the acoustic box is in the range [50 mm; 60 mm];
- the diameter of the membrane of each first loudspeaker is in the range [24 mm; 30 mm].

In addition, a set-top box such as described above is proposed, the acoustic box comprising an upper part and a lower part defined according to the height of the acoustic box.

In addition, a set-top box such as described above is proposed, the membrane of the second loudspeaker being fixed to a lower face of the lower part of the acoustic box and opening into an opening formed in said lower face.

In addition, a set-top box such as described above is proposed, wherein the lower part of the acoustic box comprises an inclined side portion, which extends from said opening, such that a width of the lower face of the lower part of the acoustic box is less, at the inclined side portion, than a width of an upper edge of the lower part, which is opposite said lower face, the inclined side portion making it possible to facilitate an airflow moved by the membrane of the second loudspeaker.

In addition, a set-top box such as described above is proposed, wherein an internal wall of an upper face of the upper part comprises first ridges forming a first pattern, and wherein an internal wall of the lower face of the lower part comprises second ridges forming a second pattern, which is different from the first pattern.

In addition, a set-top box such as described above is proposed, wherein, when the acoustic box is assembled, a minimum distance between a top of the first ridges and a top of the second ridges is between 3 mm and 5 mm.

In addition, a set-top box such as described above is proposed, wherein one among the lower edge of the upper part and the upper edge of the lower part comprises a ridge extending over a perimeter of said edge, and the other among the lower edge of the upper part or the upper edge of the lower part comprises a recess extending over a perimeter of said edge, a seal being positioned in the recess and being compressed by the ridge, when the acoustic box is assembled.

In addition, a set-top box such as described above is proposed, wherein the main electronic board is positioned, outside of the acoustic box, in a receiving cavity defined in a reinforcement formed in an external wall of a lower face of the lower part of the acoustic box.

In addition, a set-top box such as described above is proposed, further comprising a lower cap which comprises a lower face and a rear side face, the lower face comprising first holes facing the membrane of the second loudspeaker, the rear side face comprising second holes facing the inclined side portion.

In addition, a set-top box such as described above is proposed, wherein the first holes and the second holes form a honeycomb structure.

In addition, a set-top box such as described above is proposed, comprising a vertical wall, which is formed in an external wall of the lower face of the lower part of the acoustic box, which extends along a width of the lower part, and which thus physically separates the membrane of the second loudspeaker from the main electronic board.

The invention will be best understood in the light of the description below of a particular, non-limiting embodiment of the invention.

BRIEF DESCRIPTION OF THE DRAWINGS

Reference will be made to the accompanying drawings, among which.

DETAILED DESCRIPTION OF THE INVENTION

Figure 1:
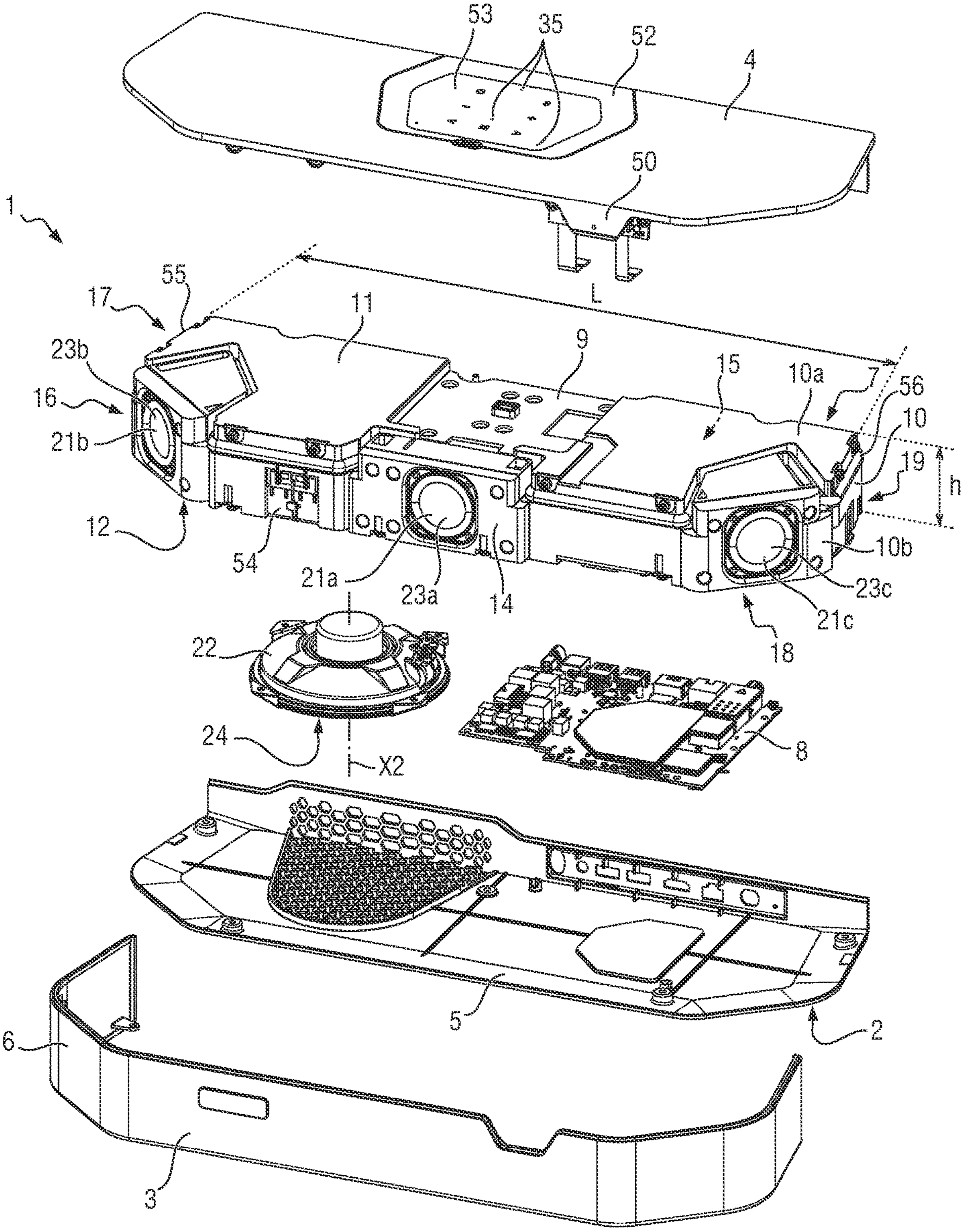
FIG. 1 is an exploded and perspective view of the set-top box.
Figure 2:
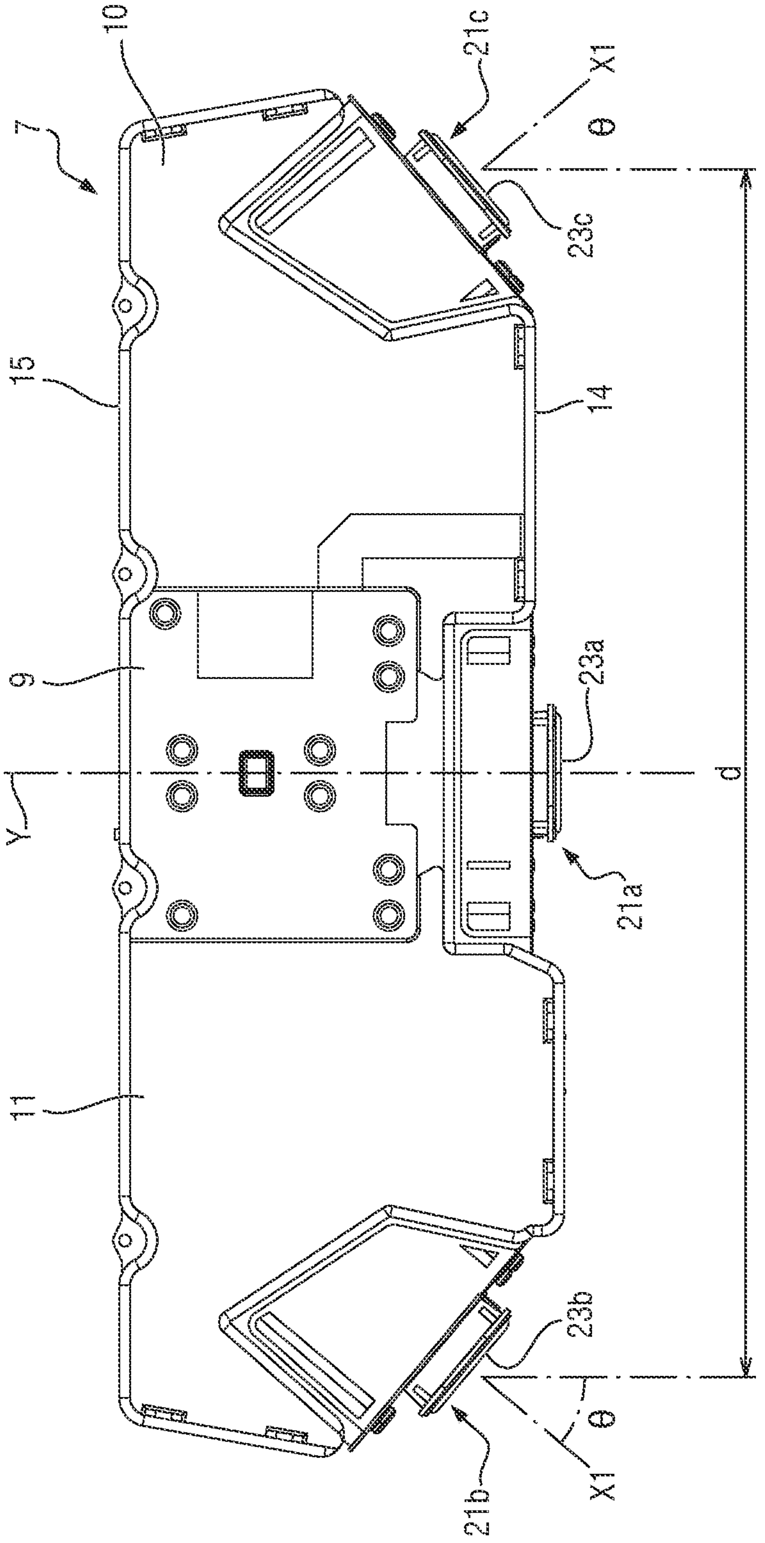
FIG. 2 is a top view of the speaker.

In reference to FIGS. 1 and 2, the set-top box 1 is designed to implement the "conventional" functions of a set-top box, which comprise, in particular, the extraction, the decoding and the processing of components of an audio-video incoming stream, and the transmission of said components to a television and optionally to other equipment (speakers, for example).

The set-top box 1 is also designed to shape and play back audio signals, and to implement sound spacing effects. The set-top box 1 can also implement a voice assistance method.

The set-top box 1 is intended to be placed on a support, such that its lower face 2 rests on said support.

The nominal operating position of the set-top box 1, making it possible to optimise the sound playback, is a position wherein the set-top box 1 is located in front of the television, such that its front face 3 is positioned facing the user, when they are set up to watch a programme on the television.

In this case, all the positional terms, such as front, rear, upper, lower, left, right, etc., are interpreted by considering that the set-top box 1 is located in its nominal operating position, and is seen from the front (as if it was seen by the user).

The set-top box 1 comprises an upper cap 4, a lower cap 5, a side support 6, a speaker 7, a main electronic board 8 and a secondary electronic board 9 comprising microphones.

The main electronic board 8 comprises, in particular, a decoding module, which implements the decoding function, a communication module, arranged in particular to transmit audio and video streams to the equipment to which the set-top box 1 is connected, an audio module, and a power supply module, which supplies supply voltages and currents to these modules. The audio module is connected to the loudspeakers of the speaker 7 of the set-top box 1 and comprises, in particular, amplifiers.

As will be seen below, the main electronic board 8 is mounted parallel and in the proximity of the lower cap 5, and the secondary electronic board 9 is mounted parallel and in the proximity of the upper cap 4 of the set-top box 1.

A fabric (not represented) covers the side support 6 by being fixed to it.

The speaker 7 comprises an acoustic box 10 and loudspeakers integrated in the acoustic box.

The acoustic box 10 comprises two parts: an upper part 10*a* and a lower part 10*b*, which are defined in the height of the acoustic box 10. These two parts are assembled to one another during the manufacture of the speaker 7.

The acoustic box 10 comprises an upper face 11 (which is the upper face of the upper part 10*a*), a lower face 12 (which is the lower face of the lower part 10*b*), a front face 14, a rear face 15, and side faces. The side faces comprise a front-left side face 16, a rear-left side face 17, a front-right side face 18, and a rear-right side face 19.

The loudspeakers comprise first loudspeakers 21, in this case, three first loudspeakers 21*a*, 21*b*, 21*c*, and a second loudspeaker 22.

Each first loudspeaker 21 is a "midrange" loudspeaker, also called medium or medial. The design of the first loudspeakers 21 is therefore optimised for playing back medium frequencies and high frequencies (frequencies, for example, of between 500 Hz and 5 kHz).

The second loudspeaker 22 is a "boomer" or "woofer" loudspeaker. The design of the second loudspeaker 22 is therefore optimised for playing back low frequencies (frequencies, for example, of between 50 Hz and 500 Hz).

The first loudspeaker 21*a* is fixed to a central portion of the front face 14 of the box 10. Its membrane 23*a* opens into an opening made in said front face 14.

The first loudspeaker 21*b* is fixed to the front-left side face 16 of the box 10. Its membrane 23*b* opens into an opening made in said front-left side face 16.

The first loudspeaker 21*c* is fixed to the front-right side face 18 of the box 10. Its membrane 23*c* opens into an opening made in said front-right side face 18.

The second loudspeaker 22 is fixed to the lower face 12 of the box 10. Its membrane 24 opens into an opening made in said lower face 12

The two first loudspeakers 21*b* and 21*c* are therefore positioned at the front and on each side of the box 10, and are each oriented towards the outside of the box 10, such that for each first loudspeaker 21*b*, 21*c*, an angle θ between a central axis X1 of a membrane of said first loudspeaker and a front-to-rear axis Y of the box 10 is between 30° and 50°.

In this case, for each first loudspeaker 21*b*, 21*c*, the angle θ between the central axis X1 of the membrane of said first loudspeaker and the front-to-rear axis Y of the box 10 is preferably in the range [38°; 42°], and is advantageously equal to 40°.

It is noted that, in this case, the membranes of the loudspeakers 21, 22 are revolving parts, which each extend about an axis of revolution. The central axis of each membrane is its axis of revolution.

However, the membranes are not necessarily revolving parts, and can have, for example, when they are seen in a cross-section along a plane P, an ellipsis shape or a rounded rectangle shape. In this case, the central axis is the axis which passes through the centre of said shape, by being perpendicular to said plane P.

By "front-to-rear axis", this means, in this case, an axis perpendicular to the front face 14 and to the rear face 15 of the box 10 and passing through the centre of these faces.

The front-to-rear axis Y of the box 10 is also that of the set-top box 1.

The central axis X1 of the membrane 23*a* of the first loudspeaker 21*a* is parallel to the front-to-rear axis Y (combined, in this case).

The central axes of the membranes of the first loudspeakers 21 are horizontal axes. The central axis X2 of the membrane 24 of the second loudspeaker 22 is a vertical axis.

The length L of the box 10 is clearly greater than its height h. The ratio between the distance d between the centres of the membranes 23*b*, 23*c* of the first loudspeakers 21*b*, 21*c*, and the height h of the box 10, is greater than 5 (by greater, this means greater than or equal to).

By "centre of a membrane", this means the centre of the membrane at its largest circumference.

In this case, the distance d between the centres of the membranes 23*b*, 23*c* of the first loudspeakers 21*b*, 21*c* is in the range [320 mm; 380 mm], and is advantageously equal to 350 mm.

The total length L of the acoustic box 10 is in the range [350 mm; 410 mm], and is advantageously equal to 380 mm.

The height h of the acoustic box 10 is in the range [50 mm; 60 mm], and is advantageously equal to 55 mm.

The height h' of the set-top box 1 is in the range [55 mm; 65 mm], and is advantageously equal to 60 mm.

The low height of the box 10, and therefore of the set-top box 1, has proved to be advantageous for the following reason.

It has been observed that a vast majority of televisions are designed, such that, when a set-top box 1 of this height is positioned in front of the television, the set-top box 1 does not conceal the image played back at all. The set-top box 1 can therefore be positioned in front of the television, and therefore facing the user, which makes it possible to optimise the output of the sound spacing effects.

The relatively large distance between the first loudspeakers 21*b*, 21*c* is itself also very advantageous.

The sound spacing is the capacity of an audio system to produce a three-dimensional sound field, which gives the impression that the sounds come from different positions in the space. When the loudspeakers are spaced apart by a specific distance, this makes it possible to reproduce a more realistic and precise sound field, while an unsuitable gap can alter this spacing.

When music or any other audio content is listened to, our brain uses the differences in arrival time and sound intensity between our two ears to locate sound sources in the space. If the loudspeakers are too close, these differences are insufficient and our brain cannot correctly process the space information, which leads to a loss of precision and of realism.

Conversely, if the loudspeakers are too spaced apart, the spacing can seem artificial or confused, as the sound will take more time to arrive to the listener from each loudspeaker, which can affect the perception of the direction of the sound sources. Furthermore, an unsuitable gap can also cause interferences between the signals emitted by the loudspeakers, producing undesirable distortion and colouring effects.

Thus, the gap of the loudspeakers has an impact on the quality of the sound spacing, as it can alter the precision, the realism and the clarity of the three-dimensional sound field, as well as the perception of the sound sources in the space. To obtain an optimal spacing, it is therefore important to choose a gap adapted to the listening room and to the configuration of the loudspeakers: an example of optimal configuration can be side loudspeakers spaced apart by less than twice the average gap of our ears, and placed at more than two metres from the side walls of the room.

The dimensions of the acoustic box 10 and the spacing between the first loudspeakers 21*b*, 21*c* are therefore defined to optimise the sound output.

The orientation of the first loudspeakers 21*b*, 21*c*, with respect to the front-to-rear axis Y of the box 10, is very advantageous with respect to a more conventional orientation of 90°.

If the loudspeakers are positioned so as to project the sound directly to the ears of the listener, this can improve the spacing at the central concentration point, as the sound arrives directly to the place where it is supposed to be heard. However, when the listener is away from this ideal listening zone, the spacing is clearly degraded, making the multi-loudspeaker sound source equivalent to a monophonic specific source.

The projection angle is the angle between the axis of the loudspeaker and the place where the sound is directed. This is an important factor which can affect the quality of the sound spacing. Indeed, the perception of the position of the sound sources in the space depends on the way in which the sound is projected in the listening room, as well as the placement of the loudspeakers. If the loudspeakers are oriented so as to project the sound to the walls or the ceilings having reverberating features (average absorption coefficient $\alpha<0.5$), this will produce reflections and echoes. The current spacing algorithms (in particular, those of Dolby or DTS, or other audio software development companies) use these effects to enlarge the sound stage.

Moreover, if the loudspeakers are placed too close to the listener and oriented directly towards them, the sound stage can seem narrow and confined. However, if the loudspeakers are placed too far and oriented so as to create a wider angle, the sound stage can seem more spacious and immersive.

The projection angle of the sound is therefore a key element which has a significant impact on the quality of the sound spacing. The chosen orientation, of 40° with respect to the front-to-rear axis Y, is suitable and optimal to obtain a precise and realistic spacing, as well as a wide and immersive sound stage.

In the box 10, the second loudspeaker 22 is dedicated to playing back low-frequency audio components. The second loudspeaker 22 is connected to an audio output dedicated to an audio module implemented on the main electronic board 8.

The low-frequency audio signal on this dedicated audio output is defined as follows.

In the case where the audio module receives, at the input, a stereo input signal, this low-frequency audio signal is defined by the result of the extraction of low frequencies from the other channels up to a frequency defined by the sound capacities of the loudspeakers. This frequency is called: low-frequency component extraction frequency.

In the case of a multichannel input signal comprising an channel (Low Frequency Effects; this is a signal of LFE frequencies typically less than 120 Hz), the low-frequency audio signal is defined by the mixing of the LFE channel and of the result of the extraction of low frequencies from the other channels up to a frequency defined by the sound capacities of the loudspeakers. This frequency is called: maximum low-frequency component extraction frequency.

The sound spacing methods require to apply delays and phase shifts to the different audio channels (mainly Left and Right), in this case. Yet, the action of mixing the low-frequency components of spaced channels together to a dedicated audio output (connected to the second loudspeaker 22) will substantially degrade the audio playback. Thus, in the worst case scenario, Left and Right channels in phase opposition, the resulting signal would be zero.

It is therefore necessary to space the channels from a frequency greater than the extraction frequency of the low-frequency components.

However, in order to benefit from the best spacing possible, it is necessary to enable the spacing effects to be applied onto a frequency range as wide as possible, and therefore to use a low extraction frequency which is the lowest possible.

The value of this low-frequency component extraction frequency is determined by the features of the loudspeakers associated with each of the channels. An in-depth study of these is necessary.

Figure 3:
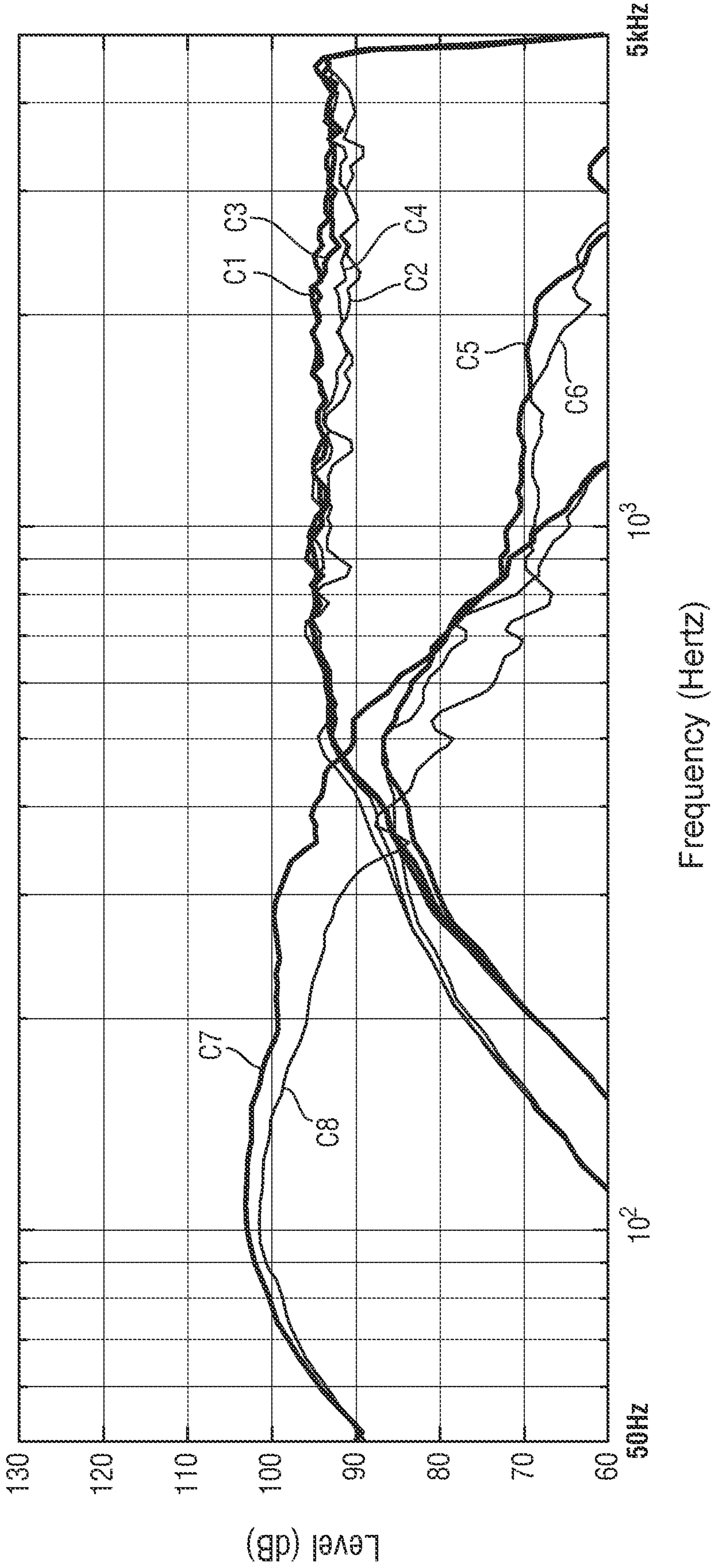
FIG. 3 is a graph comprising curves of the level of playback from loudspeakers according to the frequency.

The curve C1 is seen in FIG. 3, representing, according to the frequency, the playback level of a left loudspeaker (midrange) of reduced size. The curve C2 is an equivalent curve for a larger left loudspeaker. The curve C3 is an equivalent curve for a right loudspeaker (midrange) of reduced size. The curve C4 is an equivalent curve for a larger right loudspeaker. The curve C5 is an equivalent curve for a central loudspeaker of reduced size. The curve C6 is an equivalent curve for a larger central loudspeaker (midrange). The curve C7 is an equivalent curve for a low-frequency loudspeaker of reduced size. The curve C8 is an equivalent curve for a larger low-frequency loudspeaker.

In this example, the configuration with loudspeakers of reduced size (thick line curves) induces a low-frequency component extraction frequency of 475 Hz. The configuration with larger loudspeakers (thin line curves) induces a low-frequency component extraction frequency of 350 Hz. In the first case, the spacing effects can be played back, without risk of loss, from 475 Hz. In the second case, the spacing effects can be played back, without risk of loss, from 350 Hz. Therefore, the interest is seen of having loudspeakers, the membranes of which have a relatively large size.

In the acoustic box 10, the ratio between the diameter D of the membrane 23 of each first loudspeaker 21 and the height h of the box 10 is greater than 0.4 (by greater, this means greater than or equal to).

It is noted that, if the membrane is not circular, by "diameter", this means the largest dimension of the shape of the membrane seen as a cross-section along the plane P perpendicular to the central axis (i.e. for example, the length of the large axis of the ellipsis or the length of the rounded rectangle).

Figure 4:
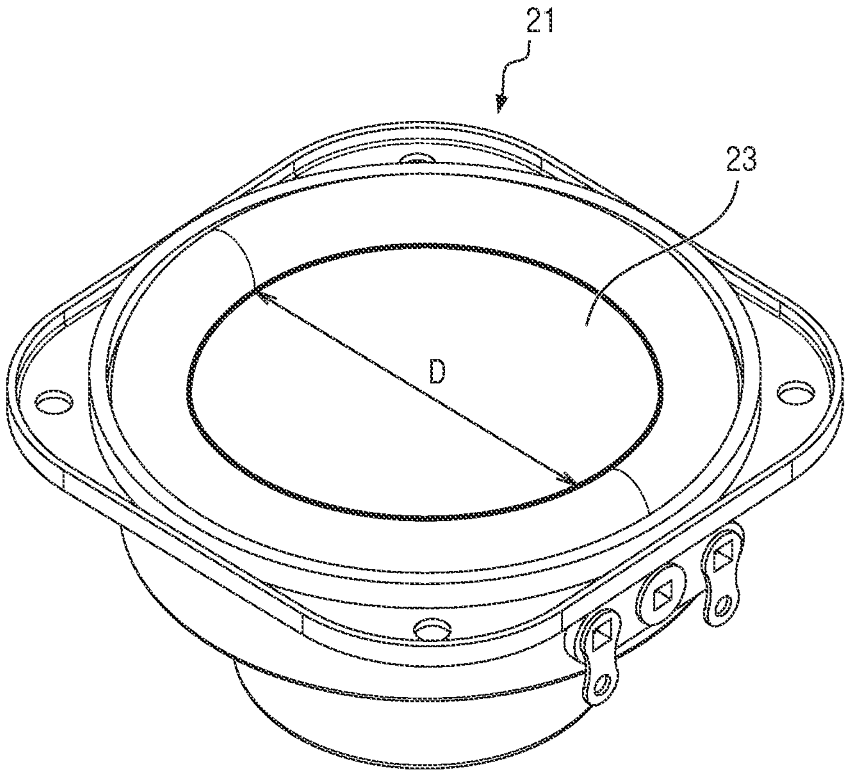
FIG. 4 is a perspective view of a first loudspeaker.

In this case, in reference to FIG. 4, the diameter D of the membrane 23 of each first loudspeaker 21 is in the range [24 mm; 30 mm], and is advantageously equal to 27 mm.

This relatively high diameter makes it possible to increase the low-frequency component extraction frequency. The Thiele & Small parameters are a set of electromechanical parameters which define the performance of a low-frequency loudspeaker. Among these magnitudes, the resonance frequency to which the loudspeaker naturally resonates when it is in an open circuit, i.e. without being mounted in a speaker. The loudspeaker being able to be considered as a mass-spring system, the resonance frequency of a loudspeaker is determined by the movable mass (generally a cone or a dome) and the rigidity of the suspension which holds the movable mass in place. According to the formula $F=(1/(2\cdot\pi))\cdot\sqrt{(k/m)}$, the larger the membrane is, therefore the larger the movable mass "m" is, the lower the resonance frequency will be. This means that the loudspeaker is more effective in reproducing low frequencies, as it can move a larger quantity of air at lower frequencies.

However, it is important to note that the quality of the reproduction of low frequencies does not only depend on the size of the loudspeaker. Other factors, such as the design of the speaker, the material of the membrane of the loudspeaker and the quality of the magnetic circuit can also have a significant impact on the low-frequency performance. All these aspects have been considered in the design of the product in question in this description, in particular, the use of broadband loudspeakers having a cutoff frequency of around 250 Hz.

Figure 5:
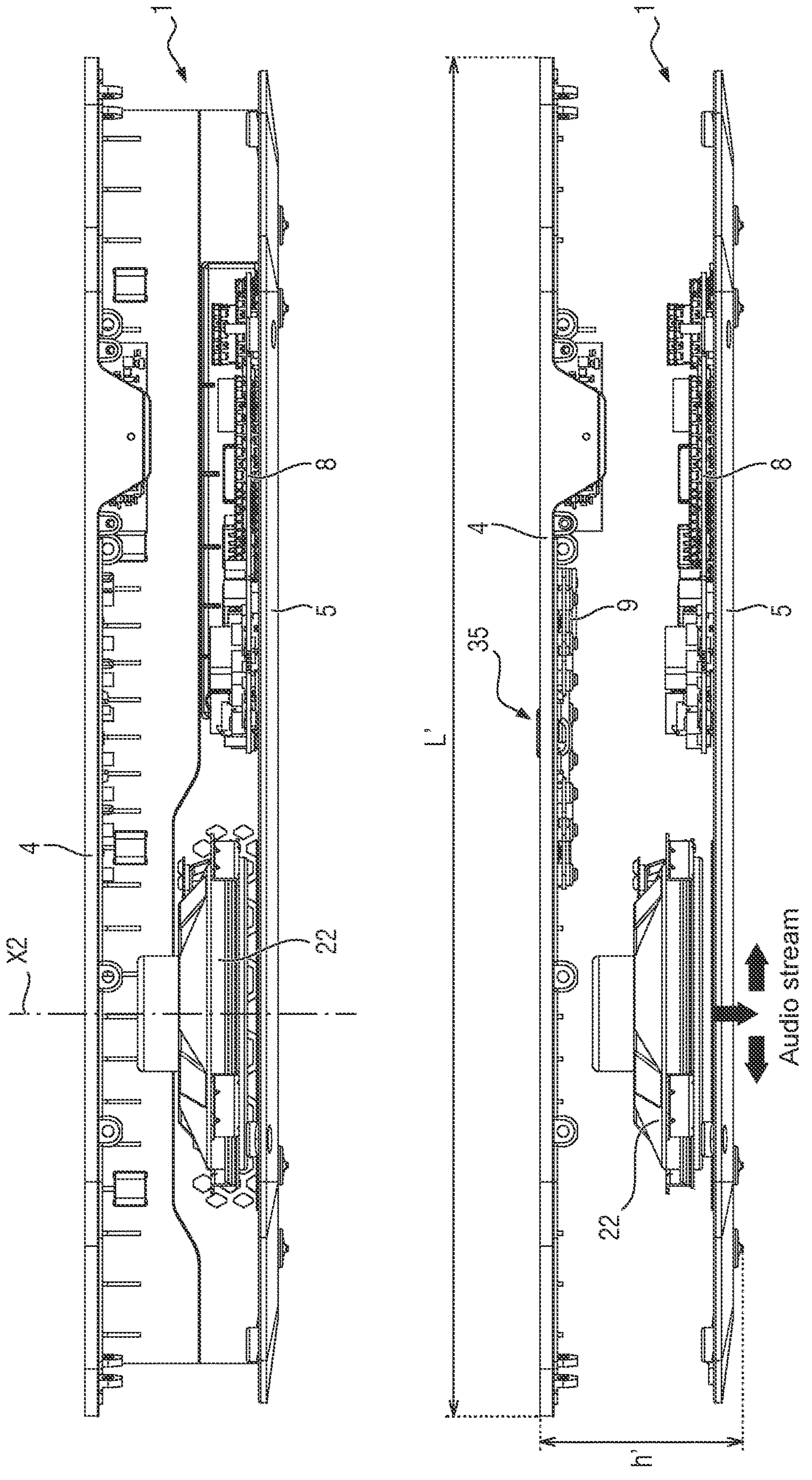
FIG. 5 represents two front views of the set-top box, wherein only certain components are represented.
Figure 6:
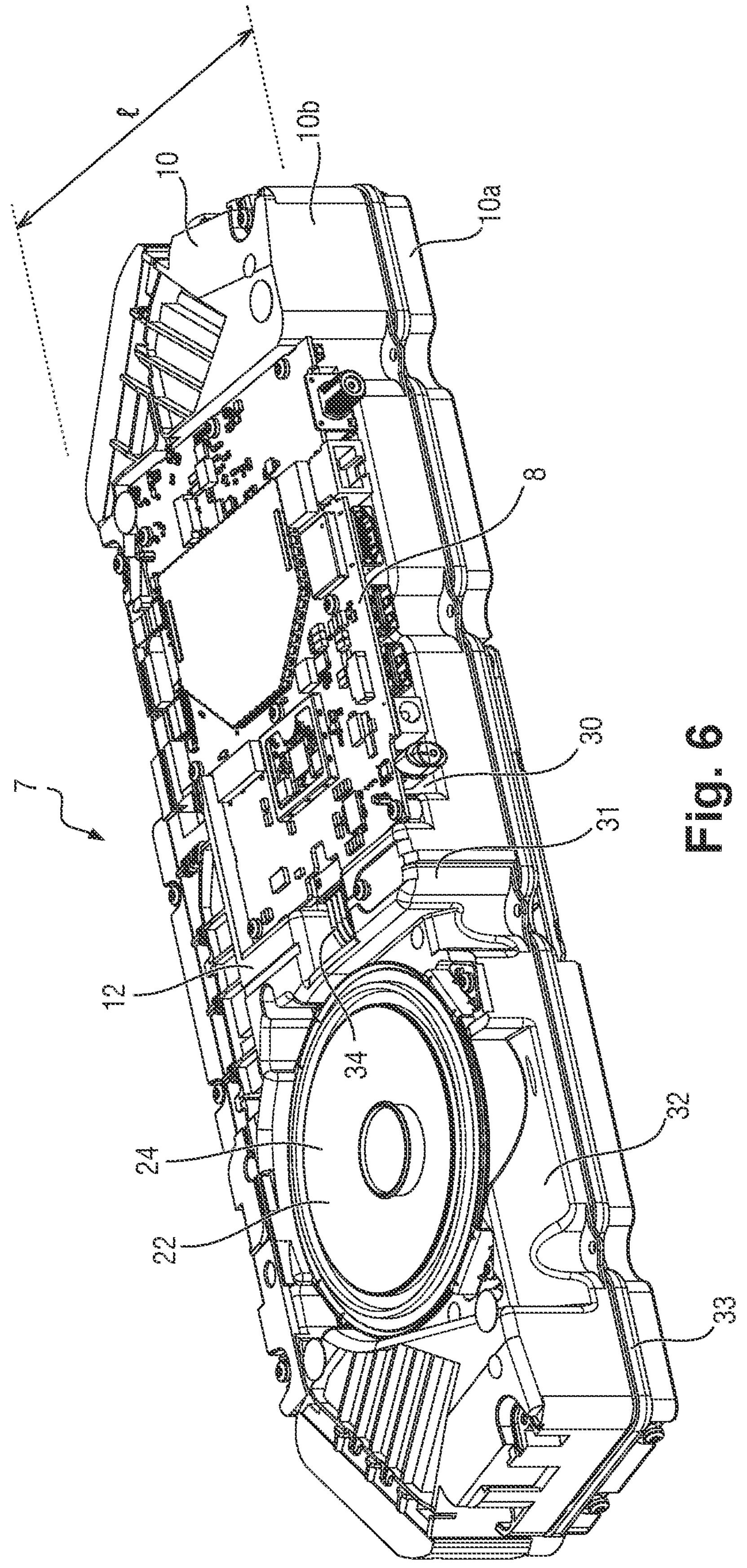
FIG. 6 is a bottom and perspective view of the speaker.

In reference to FIGS. 5 and 6, the second loudspeaker 22 and the main electronic board 8 are positioned on either side, and extending successively along a length L' of the set-top box 1 which is perpendicular to the front-to-rear axis Y. The second loudspeaker 22 is located to the left of the main electronic board 8.

The second loudspeaker 22 and the main electronic board 8 are therefore not above one another, but next to one another, which makes it possible to reduce the height of the set-top box 1.

The spacing between the first loudspeakers 21*b*, 21*c* makes this arrangement possible.

The main electronic board 8 is positioned in a receiving cavity 30, which is located in a reinforcement formed in the external wall of the lower face 12 of the lower part 10*b* of the acoustic box 10. The main electronic board 8 is fixed to the lower part 10*b* of the acoustic box 10 while being positioned outside of it.

A vertical wall 31 is formed in the external wall of the lower face 12 of the lower part 10*b* of the acoustic box 10. This wall 31 extends along the width 1 of the acoustic box 10 and thus physically separates the membrane 24 from the second loudspeaker 22 and the main electronic board 8. The cables 34 which connect the main electronic board 8 to the loudspeakers are distinguished, by passing through the wall 31 via a sealed connection.

The wall 31 makes it possible to insulate the second loudspeaker 22 from the receiving cavity 30 of the acoustic box 10 reserved for the main electronic board 8. The formation of stationary waves coming from the articulation of the membrane 24 of the second loudspeaker 22 is thus avoided, in the receiving wall 30.

The spacing of the first loudspeakers 21*b*, 21*c* makes it possible, despite the reduced height of the set-top box 1 and therefore of the acoustic box 10, to obtain a very consequent sound volume dedicated to the second loudspeaker.

This volume is, in this case, equal to 1 L.

A acoustic box is mainly a casing which contains one or more loudspeakers. Each loudspeaker produces a front sound wave which propagates outside of the speaker, and a rear sound wave which remains in the speaker. Thus, the greater the air volume behind the loudspeaker is, the lower the limitation of the articulation of the membrane of said loudspeaker is. Yet, at the playback of low frequencies requires more air movement than that of medium and acute frequencies, the internal volume of the speaker and the playback level of low frequencies are directly correlated. A large internal speaker volume will make it possible to produce the most powerful low frequencies.

Figure 7:
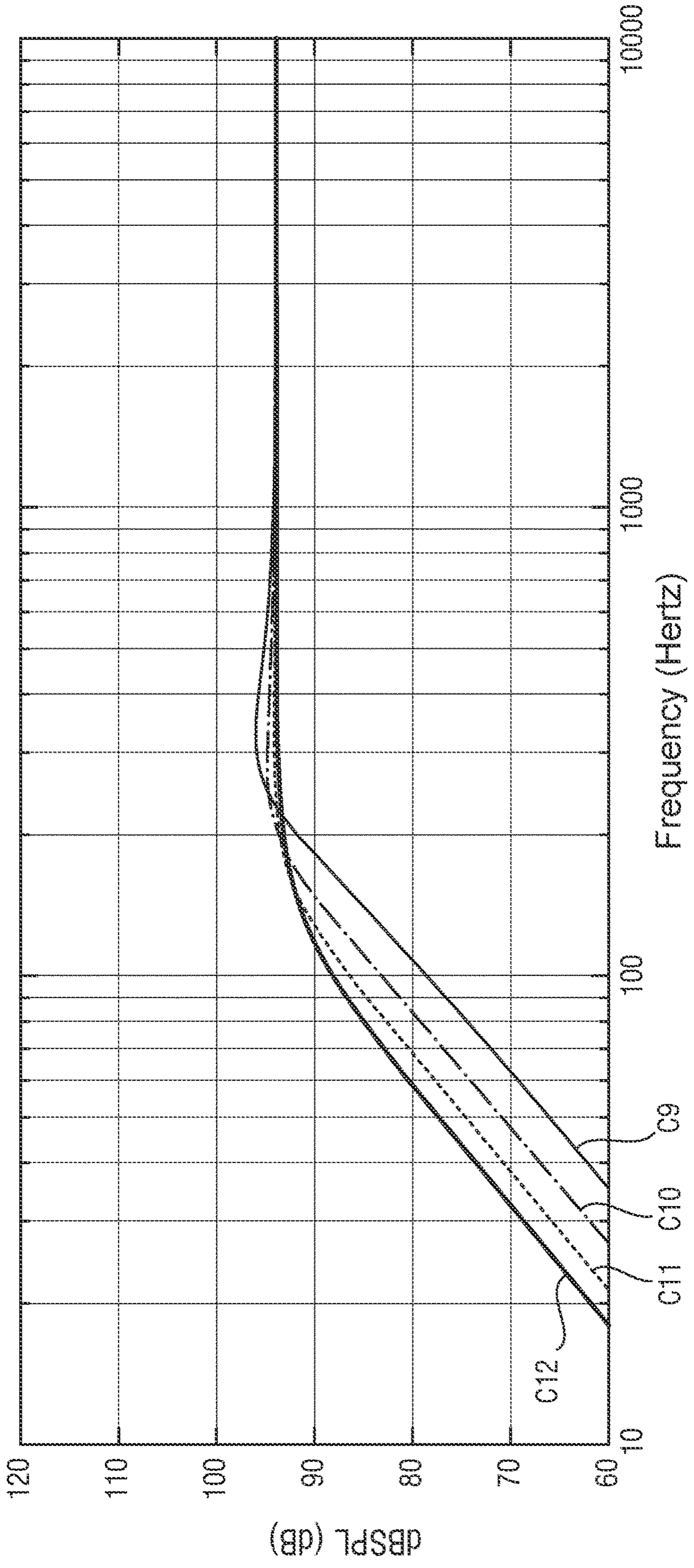
FIG. 7 is a graph comprising curves of the frequency response of a loudspeaker according to the sound volume of the speaker.

What has just been described in reference to FIG. 7 is illustrated.

The frequency response of one same loudspeaker in a speaker of internal volume equal to a quarter-litre (curve C9), a half-litre (curve C10), one litre (curve C11) and two litres (curve C12) has been simulated.

It is therefore clearly observed that the cutoff frequency in the basses is inversely proportional to the volume of the speaker 7.

It is seen in FIG. 6 that the lower part 10*b* of the acoustic box 10 comprises an inclined side portion 32, which extends from the opening formed in the lower face 12 of the acoustic box 10, wherein the membrane 24 of the second loudspeaker 22 opens. Due to this inclined side portion 32, the width of the lower face 12 of the lower part 10*b* of the acoustic box 10 is less, at the inclined side portion 32, than the width of the upper edge 33 of the lower part 10*b* of the acoustic box 10 which is opposite said lower face 12.

The inclined side portion 32 makes it possible to facilitate an airflow moved by the membrane 24 of the second loudspeaker 22. Thus, the open surface is maximised, by benefiting not only from the lower face 2 of the set-top box 1, but also from its rear face.

It is noted that all the outer edges of the acoustic box 10 are radiated, again to facilitate the airflow.

The arrangement of the second loudspeaker 22 and of the main electronic board 8 makes it possible to position the secondary electronic board 9, such that the microphones 35 are offset, along the length of the set-top box 1, with respect to the second loudspeaker 22. The microphones 35 are located outside of a cylindrical "virtual" volume having as longitudinal axis, the central axis X2 of the membrane 24 of the second loudspeaker 22, and as diameter, the diameter of said membrane 24.

The sensitive cells of the microphones 35 are in sound communication with the outside of the set-top box 1 via holes made in the upper cap 4 of the set-top box 1, while the membrane 24 of the second loudspeaker 22 opens into an opening formed in the lower face 12 of the acoustic box 10, and therefore at the lower cap 5 of the set-top box 1.

The surface comprising the microphones 35 and the second loudspeaker 22 are therefore completely decorrelated: the elements are not in the same axis, and the output of the second loudspeaker 22 is done on the opposite plane (lower surface of the set-top box 1). Due to this, sound pollution, captured by the microphones 35 and induced by the second loudspeaker 22, is highly reduced.

Moreover, the main electronic board 8 and the second loudspeaker 22 are each very slightly impacted by the heat releases of the other. In addition, the two faces of the main electronic board 8 now face inert surfaces, being able to serve as a heat dissipator.

The lower cap 5 of the set-top box 1 is, in this case, made of a material which has a high heat conduction. This material is, for example, a metal material. The lower cap 5 is, in this case, made by aluminium casting.

If the lower cap 5 was made of plastic, it would be necessary to add a dissipation sheet under the main electronic board 8. In this case, this sheet is not necessary: the material used to manufacture the lower cap 5 therefore makes it possible to reduce the height of the set-top box 1.

In addition, the aluminium lower cap 5 is more rigid than a plastic cap, which makes it possible to reduce the overall flexibility of the assembled product, and thus limit the risks of rub & buzz, which are interfering vibration noises created by two rigid parts, clashing during the vibration of the system by the loudspeakers.

Figure 8:
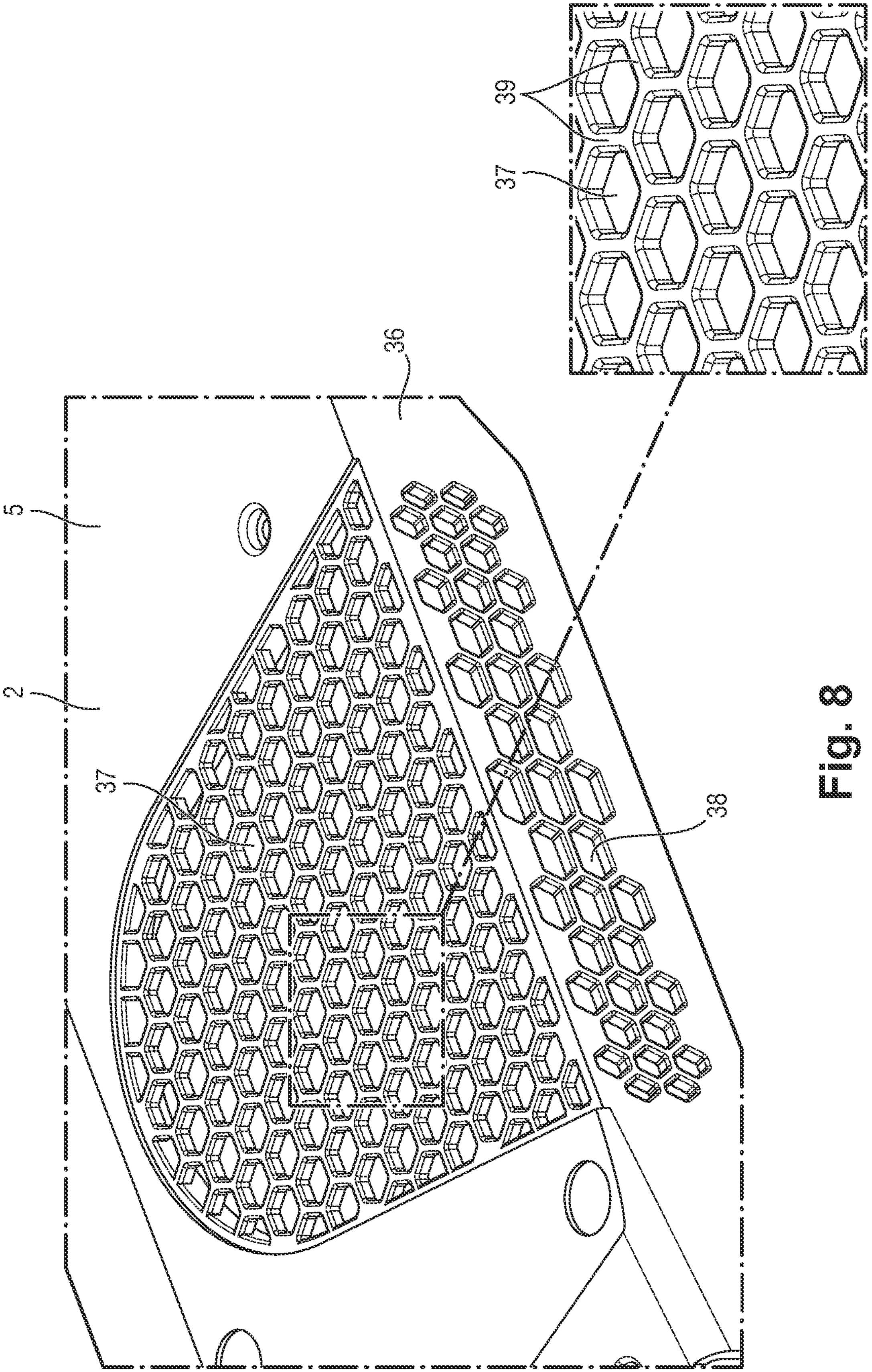
FIG. 8 represents a partial view of the lower cap, from below and in perspective, as well as magnification of the honeycomb structure.

In reference to FIG. 8, the lower face 2 of the lower cap 5 of the set-top box 1 is that of the set-top box 1. The lower cap 5 further comprises a rear side face 36. The lower face 2 comprises first holes 37 facing the membrane 24 of the second loudspeaker 22. The rear side face 36 comprises second holes 38 facing the inclined side portion.

The first holes 37 and the second holes 38 form a honeycomb structure.

Thus, an optimal diffusion of the sound in low frequencies is made possible, and any risk of whistling linked to an open surface which is too low facing the second loudspeaker 22 is avoided. The juxtaposed structure of hexagonal holes makes it possible to maximise the opening rate, with respect to a repetition of round or square holes.

The first holes 37 and the second holes 38 are delimited by edges 39 (formed on the surface of the lower cap 5). Each edge 39 is beveled. Adding these bevels makes it possible to favour the airflows.

As has been seen, almost all the electronics of the set-top box 1 are located on one single electronic board (the main electronic board 8), which is located outside of the acoustic box 10. The acoustic box 10 is therefore simple to assemble and easy to test by itself.

In addition, having static interconnections between several boards, which are expensive and generate electromagnetic interference, is avoided. The inter-modular static connections moreover constitute a sensitive point of mechanical reliability in case of the product falling. This problem is not found in the set-top box 1.

The set-top box 1 further comprises condensers (not represented), which are electrolytic condensers which have a large volume.

These electrolytic condensers are connected to the audio module of the main electronic board 8 and contribute to the power supply function of the audio electrical components of the set-top box 1.

These condensers have been moved inside the acoustic box 10, in order to optimise the sound volume available for the second loudspeaker 22.

Indeed, if these condensers had been mounted on the main electronic board 8, the acoustic box 10 facing these components would have had to have been removed, to avoid interference. Therefore more volume would have been lost, as the plastic wall would be added to the volume of the components themselves. The high internal volume of the acoustic box, making it possible to position the condensers there, also has the advantage of having a local energy reserve, reducing the complexity of the outer power supply unit, and reducing large remote power draws, being conveyed in a reduction of electromagnetic emissions.

Figure 9:
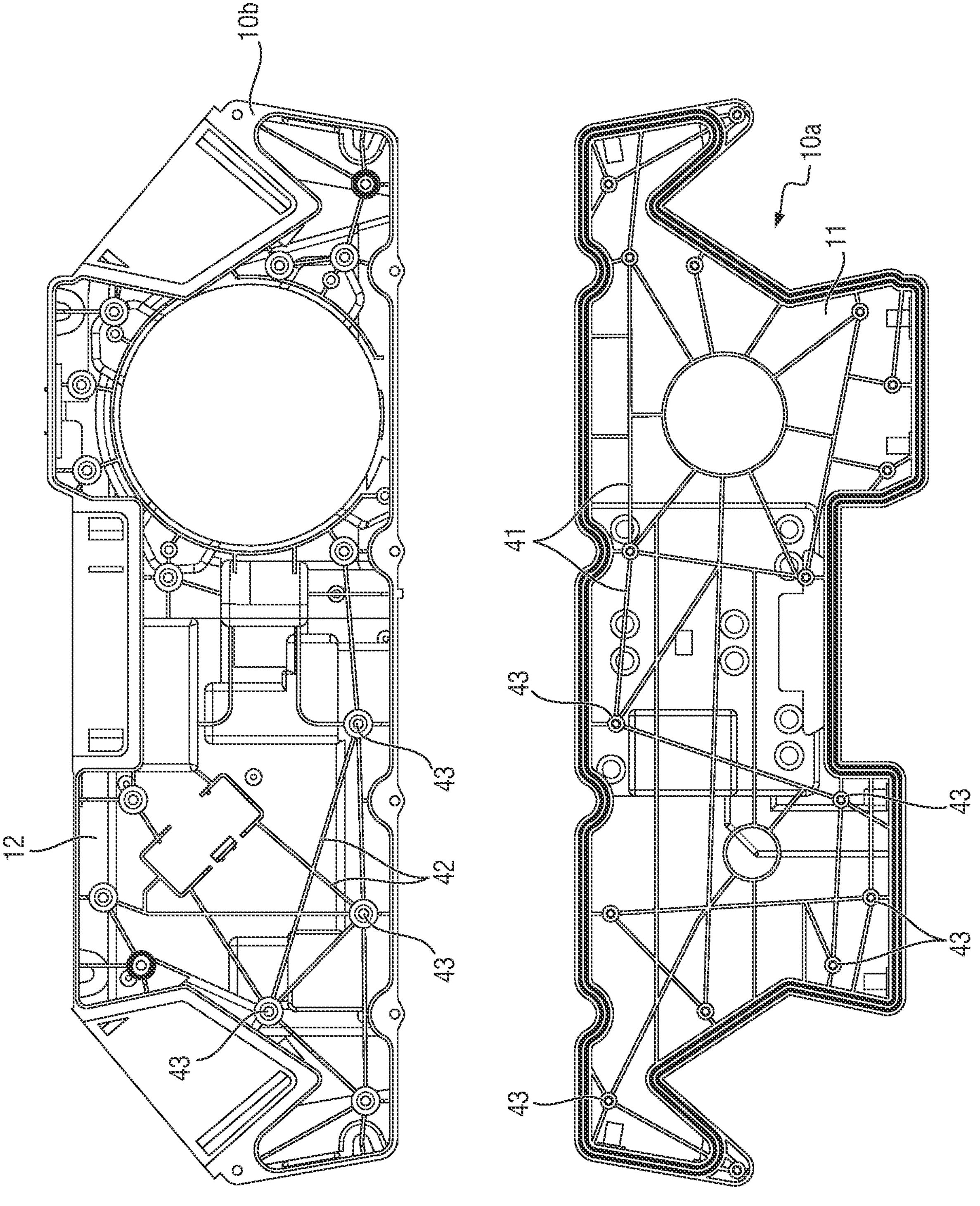
FIG. 9 represents a view of the internal wall of the lower face of the lower part of the box, and a view of the internal wall of the upper face of the upper part of the box.

In reference to FIG. 9, the internal wall of the upper face 11 of the upper part 10*a* of the acoustic box 10 is provided with a network of first ridges 41. Likewise, the internal wall of the lower face 12 of the lower part 10*b* of the acoustic box 10 is provided with a network of second ridges 42.

The ridges 41, 42 extend vertically from the internal walls, and connect the fixing points 43 of these two parts 10*a*, 10*b*.

The ridges 41, 42 make it possible to limit the deformations of the box linked to the internal pressure variations created by the movement of the membranes of the loudspeakers and by the vibrations generated by the latter.

The first ridges 41 form a first pattern. The second ridges 42 form a second pattern, which is different from the first pattern. This makes it possible to avoid the formation of partitions, inside the box 10, which would generate the airflows.

The height of the ridges is a very important parameter for preventing the bending of the parts, as it relies on the power 3.

The height of the ridges 41, 42 therefore has been maximised in the two parts.

The ridges 41, 42 are however designed so as to preserve a certain minimum distance between the top of the first ridges 41 of the upper part 10*a* and the top of the ridges 42 of the lower part 10*b* of the acoustic box 10 when this is assembled.

This minimum distance is, in this case, between 3 mm and 5 mm, and is, for example, equal to 4 mm.

This space makes it possible to avoid whistling effects, which would have been created by the air movements through the thin slots thus created.

Figure 10:
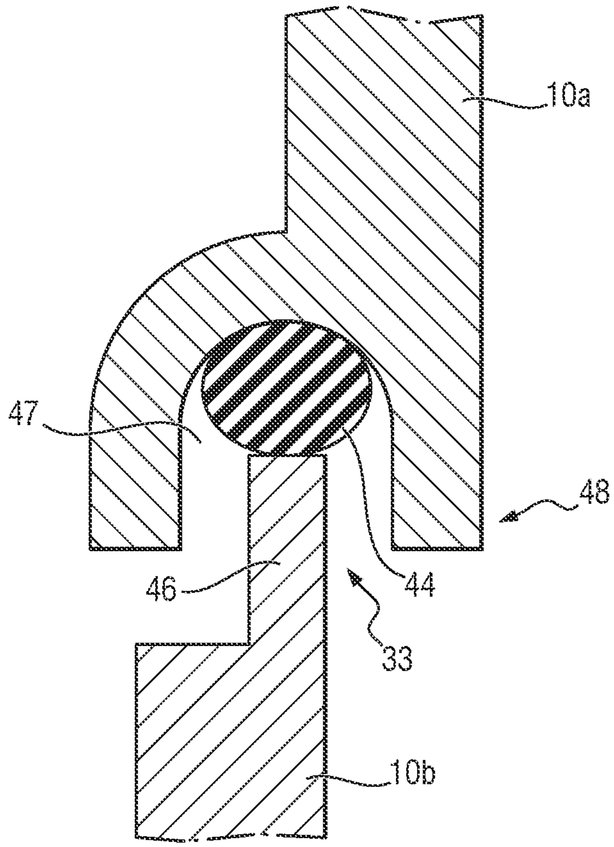
FIG. 10 is a cross-sectional view of a recess and of a ridge formed on the edges of the upper and lower parts of the box.

In reference to FIG. 10, the acoustic box 10 comprises a seal 44 between the two parts 10*a*, 10*b*. The seal 44 is positioned on the internal perimeter of the box 10 (between the two parts 10*a*, 10*b*), making it possible to preserve a closed sound volume.

Given the large dimension of the parts constituting the acoustic box 10, the manufacturing tolerances by the plastic injection method are large, around +/−1 mm.

A circular cross-section elastomer seal 44 is used. This solution can be easily industrialised, and without loss of material during manufacture (contrary, for example, to a flat foam seal, the cutout of which generates a lot of material loss).

One of the lower edges 48 of the upper art 10*a* or upper edge 33 of the lower part 10*b* comprises a ridge 46 extending over the entire length of the perimeter of said edge, and the other of the lower edges of the upper part or upper edge of the lower part comprises a recess 47 extending over the entire length of said edge.

In this case, the ridge 46 extends over the upper edge 33 of the lower part 10*b* and the recess 47 extends over the lower edge 48 of the upper part 10*a*.

It would be possible to invert this configuration: the recess 47 would thus be formed over the perimeter of the lower part 10*b*, and the ridge 46 over the perimeter of the upper part 10*a*.

The recess 47, when it is seen in a cross-section along a plane perpendicular to the perimeter, comprises a semi-circular-shaped bottom and two vertical walls which extend from the opening of the recess 47 to the bottom.

The seal 44 is deposited in the recess 47. The ridge 46 compresses the seal 44 during the assembly and the fixing together of the upper part 10*a* and of the lower part 10*b* (by screwing via the fixing points 43, for example).

The maximum width of the recess 47, i.e. the distance between the vertical walls, is between 2 and 4 times the width of the ridge 46.

A large clearance is therefore left between the flattening ridge 46 and the side walls of the recess 47 to absorb the dimensional dispersions.

By returning to FIG. 1, it is noted that the front face 3 of the acoustic box 10 has a recess 50 making it possible to receive, in addition to the status LEDs and the infrared receiver, a camera module.

The set-top box 1 further comprises a certain number of radiofrequency antennas, connected to radiofrequency modules of the communication module of the main electronic board 8. These antennas comprise an antenna 52 positioned on the upper cap 4 of the set-top box 1, and surrounds the control interface 53 (buttons) of the set-top box 1 and the microphones 35. These antennas also comprise antennas 54, 55 and 56, located respectively on the front face 14, the rear-left side face 17, and the rear-right side face 19 of the box 10. These antennas, due to the significant length of the box 10 and of the set-top box 1, benefit from a good physical separation, even when they share the same frequencies.

Naturally, the invention is not limited to the embodiments described, but comprises any variant entering into the field of the invention, such as defined by the claims.

The invention claimed is:

1. A set-top box, integrating a speaker which comprises an acoustic box, wherein at least two first loudspeakers are integrated, arranged to play back medium and high frequencies, and a second loudspeaker arranged to play back low frequencies, the two first loudspeakers being positioned at the front and on each side of the acoustic box, a central axis (X2) of a membrane of the second loudspeaker being a vertical axis, the set-top box comprising, in addition, a main electronic board comprising a decoding module and an audio module, the second loudspeaker and the main electronic board being positioned to the side of one another and extending successively along a length (L') of the set-top box, which is perpendicular to a front-to-rear axis of the acoustic box.

2. The set-top box according to claim 1, wherein the two first loudspeakers are each oriented towards the outside of the acoustic box, such that, for each first loudspeaker, an angle (θ) between a central axis (X1) of a membrane of said first loudspeaker and the front-to-rear axis (Y) of the acoustic box is between 30° and 50°, a ratio between a distance (d) between the centres of the membranes of the first loudspeakers, and a height (h) of the acoustic box, being greater than 5, and a ratio between a diameter (D) of the membrane of each first loudspeaker and the height of the acoustic box being greater than 0.4.

3. The set-top box according to claim 1, wherein:

for each first loudspeaker, the angle (θ) between the central axis (X1) of the membrane of said first loudspeaker and the front-to-rear axis (Y) of the acoustic box is in the range [38°; 42°];

the distance (d) between the centres of the membranes of the first loudspeakers is in the range [320 mm; 380 mm];

the height (h) of the acoustic box is in the range [50 mm; 60 mm];

the diameter (D) of the membrane of each first loudspeaker is in the range [24 mm; 30 mm].

4. The set-top box according to claim 1, the acoustic box comprising an upper part and a lower part defined according to the height (h) of the acoustic box.

5. The set-top box according to claim 4, the membrane of the second loudspeaker being fixed to a lower face of the lower part of the acoustic box and opening into an opening formed in said lower face.

6. The set-top box according to claim 5, wherein the lower part of the acoustic box comprises an inclined side portion, which extends from said opening, such that a width of the lower face of the lower part of the acoustic box is less, at the inclined side portion, than a width of an upper edge of the lower part, which is opposite said lower face, the inclined side portion making it possible to facilitate an airflow moved by the membrane of the second loudspeaker.

7. The set-top box according to claim 4, wherein an internal wall of an upper face of the upper part comprises first ridges forming a first pattern, and wherein an internal wall of the lower face of the lower part comprises second ridges forming a second pattern, which is different from the first pattern.

8. The set-top box according to claim 7, wherein, when the acoustic box is assembled, a minimum distance between a top of the first ridges and a top of the second ridges is between 3 mm and 5 mm.

9. The set-top box according to claim 4, wherein one of the lower edges of the upper part or upper edge of the lower part comprises a ridge extending over a perimeter of said edge, and the other of the lower edges of the upper part or upper edge of the lower part comprises a recess extending over a perimeter of said edge, a seal being positioned in the recess and being compressed by the ridge when the acoustic box is assembled.

10. The set-top box according to claim 1, wherein the main electronic board is positioned, outside of the acoustic box, in a receiving cavity defined in a reinforcement formed in an external wall of a lower face of the lower part of the acoustic box.

11. The set-top box according to claim 6, further comprising a lower cap which comprises a lower face and a rear side face, the lower face comprising first holes facing the membrane of the second loudspeaker, the rear side face comprising second holes facing the inclined side portion.

12. The set-top box according to claim 11, wherein the first holes and the second holes form a honeycomb structure.

13. The set-top box according to claim 4, comprising a vertical wall, which is formed in an external wall of the lower face of the lower part of the acoustic box, which extends along a width of the lower part, and which thus physically separates the membrane of the second loudspeaker from the main electronic board.

* * * * *